United States Patent
Muramatsu (10) Patent No.: US 12,518,930 B2
(45) Date of Patent: Jan. 6, 2026

(54) MULTILAYER CERAMIC CAPACITOR INCLUDING SiO2 FILM ON SURFACES THEREOF

(71) Applicant: Murata Manufacturing Co., Ltd., Nagaokakyo (JP)

(72) Inventor: Satoshi Muramatsu, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 177 days.

(21) Appl. No.: 18/093,842

(22) Filed: Jan. 6, 2023

(65) Prior Publication Data

US 2023/0260710 A1    Aug. 17, 2023

(30) Foreign Application Priority Data

Feb. 15, 2022  (JP) .................. 2022-021676

(51) Int. Cl.
| | |
|---|---|
| H01G 4/30 | (2006.01) |
| H01G 4/008 | (2006.01) |
| H01G 4/012 | (2006.01) |
| H01G 4/224 | (2006.01) |

(52) U.S. Cl.
CPC .............. *H01G 4/30* (2013.01); *H01G 4/008* (2013.01); *H01G 4/012* (2013.01); *H01G 4/224* (2013.01)

(58) Field of Classification Search
CPC .......... H01G 4/30; H01G 4/008; H01G 4/012; H01G 4/224; H01G 4/1227; H01G 4/2325; H01G 4/12; H01G 4/232; H01G 4/002; H01G 4/005
See application file for complete search history.

(56) References Cited

U.S. PATENT DOCUMENTS

| | | | |
|---|---|---|---|
| 10,366,834 B1 | 7/2019 | Lee et al. | |
| 2007/0297119 A1* | 12/2007 | Maegawa | ................ H01G 4/30 361/306.3 |
| 2016/0042864 A1 | 2/2016 | Hong et al. | |

(Continued)

FOREIGN PATENT DOCUMENTS

| | | |
|---|---|---|
| JP | 2000306765 A | 11/2000 |
| JP | 2011-3847 A | 1/2011 |

(Continued)

*Primary Examiner* — Timothy J. Dole
*Assistant Examiner* — Daniel M Dubuisson
(74) *Attorney, Agent, or Firm* — Keating & Bennett, LLP (57) ABSTRACT

A multilayer ceramic capacitor includes a capacitive element including ceramic layers, first and second internal electrodes, first and second main surfaces, end surfaces, and side surfaces. A portion of the first and second side surfaces, and a portion of the first and second end surfaces include $SiO_2$ films. The $SiO_2$ films on the first and second side surfaces cover the first and second internal electrodes, respectively exposed on the first and second side surfaces. First and second external electrodes are respectively provided at least on an outer surface of the first end surface on which the $SiO_2$ film is not provided and an outer surface of the $SiO_2$ film provided on the first end surface and on at least on an outer surface of the second end surface on which the $SiO_2$ film is not provided and an outer surface of the $SiO_2$ film provided on the second end surface.

9 Claims, 9 Drawing Sheets

(56) References Cited

U.S. PATENT DOCUMENTS

| | | | |
|---|---|---|---|
| 2017/0076870 A1* | 3/2017 | Noda | H01G 4/232 |
| 2017/0290164 A1* | 10/2017 | Feichtinger | H01C 1/148 |
| 2017/0309389 A1* | 10/2017 | Sato | H01F 41/041 |
| 2017/0330673 A1* | 11/2017 | Sato | H01F 27/2804 |
| 2018/0286591 A1* | 10/2018 | Kim | H01G 4/30 |
| 2019/0103224 A1* | 4/2019 | Han | H01G 4/2325 |
| 2019/0385795 A1* | 12/2019 | Yang | H01G 4/30 |
| 2020/0152382 A1* | 5/2020 | Sakurai | H01G 4/248 |
| 2020/0303125 A1 | 9/2020 | Tsuru et al. | |
| 2021/0090806 A1* | 3/2021 | Park | H01G 4/1218 |
| 2021/0098191 A1 | 4/2021 | Saito et al. | |
| 2022/0351907 A1* | 11/2022 | Ishizuya | H01G 4/224 |
| 2023/0154683 A1* | 5/2023 | Takata | H01G 4/224 |
| | | | 361/301.4 |

FOREIGN PATENT DOCUMENTS

| | | |
|---|---|---|
| JP | 2012-142451 A | 7/2012 |
| JP | 2021-34648 A | 3/2021 |
| JP | 2021-36609 A | 3/2021 |
| JP | 2021-97246 A | 6/2021 |
| KR | 20190121173 A | 10/2019 |
| KR | 102097333 B1 | 4/2020 |
| KR | 20200111621 A | 9/2020 |

* cited by examiner

MULTILAYER CERAMIC CAPACITOR INCLUDING SiO2 FILM ON SURFACES THEREOF

CROSS REFERENCE TO RELATED APPLICATIONS

This application claims the benefit of priority to Japanese Patent Application No. 2022-021676 filed on Feb. 15, 2022. The entire contents of this application are hereby incorporated herein by reference.

BACKGROUND OF THE INVENTION

1. Field of the Invention

The present invention relates to a multilayer ceramic capacitor in which an $SiO_2$ film is provided on an outer surface of a capacitive element, and a method for manufacturing a multilayer ceramic capacitor.

2. Description of the Related Art

Multilayer ceramic capacitors are widely used in electronic devices, electric devices, and the like.

A general multilayer ceramic capacitor includes a capacitive element in which a plurality of ceramic layers, a plurality of first internal electrodes, and a plurality of second internal electrodes are laminated, a first external electrode is provided on one end surface of a capacitive element, and a second external electrode is provided on another end surface of the capacitive element. The first internal electrodes extend to the one end surface of the capacitive element and are electrically connected to the first external electrode, and the second internal electrodes extend to the other end surface of the capacitive element and are electrically connected to the second external electrode.

In the multilayer ceramic capacitor having such a configuration, conventionally, dimensions in a width direction of the first internal electrodes and the second internal electrodes are made smaller than dimensions in the width direction of the ceramic layers so that the first internal electrodes and the second internal electrodes are not exposed on a side surface of the capacitive element. The first internal electrodes and the second internal electrodes are positioned at the center of the ceramic layers in the width direction. In this case, when the side surface of the capacitive element is viewed, the first internal electrodes and the second internal electrodes enter an interior of the capacitive element, and the first internal electrodes and the second internal electrodes are not exposed on the side surface of the capacitive element.

However, recently, unlike this structure, multilayer ceramic capacitors, as disclosed in Japanese Patent Laid-Open No. 2012-142451 and the like, in which the dimensions in the width direction of the first internal electrodes and the second internal electrodes are the same as the dimensions in the width direction of the ceramic layers have been widely used. This is because it is possible to increase a capacitance of the multilayer ceramic capacitor by making the dimensions in the width direction of the first internal electrodes and the second internal electrodes the same as the dimensions in the width direction of the ceramic layers to increase areas of the first internal electrodes and the second internal electrodes.

However, if the dimensions in the width direction of the first internal electrodes and the second internal electrodes are the same as the dimensions in the width direction of the ceramic layers, the first internal electrodes and the second internal electrodes are exposed on the side surface of the capacitive element. Therefore, in the multilayer ceramic capacitor of Japanese Patent Laid-Open No. 2012-142451, a ceramic layer different from the ceramic layers laminated on the capacitive element is provided on the side surface of the capacitive element, and the different ceramic layer covers the first internal electrodes and the second internal electrodes exposed on the side surface of the capacitive element. Hereinafter, the ceramic layer provided on the side surface of the capacitive element may be referred to as a "side gap ceramic layer".

The multilayer ceramic capacitor of Japanese Patent Laid-Open No. 2012-142451 has a problem in that a step of forming the side gap ceramic layer is complicated and productivity is not high. The multilayer ceramic capacitor of Japanese Patent Laying-Open No. 2012-142451 is manufactured, for example, through the following steps.

First, in order to collectively manufacture a large number of multilayer ceramic capacitors, a plurality of mother ceramic green sheets are prepared. Next, a conductive paste in a desired shape for providing a first internal electrode or a second internal electrode is applied to a main surface of a mother ceramic green sheet. Next, the mother green sheet to which the conductive paste for providing the first internal electrode is applied and the mother green sheet to which the conductive paste for providing the second internal electrode is applied are, for example, alternately laminated and pressurized (pressurized and heated) to be integrated, and thus an unfired mother capacitive element is prepared. Next, the unfired mother capacitive element is cut into individual unfired capacitive elements. At this stage, the layer of the conductive paste for providing the first internal electrodes and the layer of the conductive paste for providing the second internal electrodes are exposed on the side surface of the unfired capacitive element.

Next, a ceramic paste for providing a side gap ceramic layer is applied to the side surface of the unfired capacitive element, or a ceramic green sheet for providing a side gap ceramic layer is adhered. As a result, the layer of the conductive paste for providing the first internal electrodes and the layer of the conductive paste for providing the second internal electrodes, which are exposed on the side surface of the unfired capacitive element, are covered with the applied ceramic paste or the adhered ceramic green sheet.

Next, the unfired capacitive element including the side surface to which the ceramic paste is applied or to which a ceramic green sheet is adhered is fired with a desired profile. As a result, the unfired capacitive element becomes a fired capacitive element, and the ceramic paste applied to the side surface or the ceramic green sheet adhered to the side surface becomes a side gap ceramic layer. First internal electrodes and second internal electrodes are provided in the interior of the fired capacitive element.

Finally, a first external electrode and a second external electrode are provided on the fired capacitive element, and the multilayer ceramic capacitor of Japanese Patent Laying-Open No. 2012-142451 is completed.

In the multilayer ceramic capacitor of Japanese Patent Laid-Open No. 2012-142451 including the above steps, the step of applying the ceramic paste for providing the side gap ceramic layer or adhering the ceramic green sheet for providing the side gap ceramic layer to the side surface of the unfired capacitive element is extremely complicated. That is, it is necessary to apply a ceramic paste or adhere a ceramic green sheet to the side surface of extremely small individual unfired capacitive elements that are divided into individual pieces one by one, which is a difficult and time-consuming process. This has been a factor of lowering the productivity of the multilayer ceramic capacitor.

SUMMARY OF THE INVENTION

Preferred embodiments of the present invention provide multilayer ceramic capacitors each easily manufactured and achieving high productivity, although dimensions in a width direction of first internal electrodes and second internal electrodes are the same or substantially the same as dimensions in the width direction of ceramic layers.

A multilayer ceramic capacitor according to a preferred embodiment of the present invention includes a capacitive element including a plurality of ceramic layers, a plurality of first internal electrodes, and a plurality of second internal electrodes that are laminated, the capacitive element including first and second main surfaces, first and second end surfaces, and first and second side surfaces, the first and second main surfaces being opposed to each other in a height direction, the first and second end surfaces being opposed to each other in a length direction orthogonal or substantially orthogonal to the height direction, and the first and second side surface being opposed to each other in a width direction orthogonal or substantially orthogonal to the height direction and the length direction, wherein the first internal electrodes have a rectangular or substantially rectangular shape including two end portions facing each other in the width direction and two end portions facing each other in the length direction, one of the end portions facing each other in the width direction is exposed to the first side surface, the other of the end portions facing each other in the width direction is exposed to the second side surface, and one of the end portions facing each other in the length direction extends to the first end surface, the second internal electrodes have a rectangular or substantially rectangular shape including two end portions facing each other in the width direction and two end portions facing each other in the length direction, one of the end portions facing each other in the width direction is exposed to the first side surface, the other of the end portions facing each other in the width direction is exposed to the second side surface, and one of the end portions facing each other in the length direction extends to the second end surface, at least a portion of the first side surface, at least a portion of the second side surface, a portion of the first end surface, and a portion of the second end surface respectively include a $SiO_2$ film, the $SiO_2$ film provided on the first side surface covers the first internal electrodes and the second internal electrodes exposed on the first side surface, the $SiO_2$ film provided on the second side surface covers the first internal electrodes and the second internal electrodes exposed on the second side surface, and a first external electrode is provided at least on an outer surface of the first end surface on which the $SiO_2$ film is not provided and an outer surface of the $SiO_2$ film provided on the first end surface, a second external electrode is provided at least on an outer surface of the second end surface on which the $SiO_2$ film is not provided and an outer surface of the $SiO_2$ film provided on the second end surface, the first internal electrodes extended to the first end surface and the first external electrode are electrically connected, and the second internal electrodes extended to the second end surface and the second external electrode are electrically connected.

A method for manufacturing a multilayer ceramic capacitor according to a preferred embodiment of the present invention includes preparing a capacitive element including a plurality of ceramic layers, a plurality of first internal electrodes, and a plurality of second internal electrodes that are laminated, the capacitive element including a first and a second main surface, a first and a second end surface, and a first and a second side surface, the first and the second main surface being opposed to each other in a height direction, the first and the second end surface being opposed to each other in a length direction orthogonal or substantially orthogonal to the height direction, and the first and the second side surface being opposed to each other in a width direction orthogonal or substantially orthogonal to the height direction and the length direction, applying a solution including tetraethoxysilane to a portion of an outer surface of the capacitive element, hydrolyzing the tetraethoxysilane to form $SiO_2$ films on portions of the outer surface of the capacitive element, and forming a first external electrode and a second external electrode.

The multilayer ceramic capacitors according to preferred embodiments of the present invention are each easily manufactured and achieve productivity, although dimensions in a width direction of first internal electrodes and second internal electrodes are the same or substantially the same as dimensions in the width direction of ceramic layers.

In addition, in the multilayer ceramic capacitors according to preferred embodiments of the present invention, since the $SiO_2$ films cover the first internal electrodes and the second internal electrodes on the first side surface and the second side surface of the capacitive element, the first internal electrodes and the second internal electrodes are not exposed to the outer surface.

In addition, in the multilayer ceramic capacitors according to preferred embodiments of the present invention, the $SiO_2$ films reduce or prevent moisture from entering the interior of the capacitive element from the first side surface, the second side surface, the first end surface, and the second end surface of the capacitive element.

According to methods for manufacturing multilayer ceramic capacitors according to preferred embodiments of the present invention, the multilayer ceramic capacitors according to preferred embodiments of the present invention can be easily manufactured with high productivity.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Each of the preferred embodiments exemplarily illustrates a preferred embodiment of the present invention, and the present invention is not limited to the contents of the preferred embodiments. In addition, it is also possible to combine and include the contents described in the different preferred embodiments, and the included contents in this case are also included in the present invention. Further, the drawings are intended to facilitate understanding of the specification, and may be schematically drawn, and dimensional ratios of the drawn components or between the components may not match the dimensional ratios described in the specification. Moreover, the components described in the specification may be omitted in the drawings, or the number of components may be omitted.

First Preferred Embodiment

FIGS. 1, 2A, 2B, 3A, 3B, 4, and 5 show a multilayer ceramic capacitor 100 according to a first preferred embodiment of the present invention. In the drawings, a height direction T, a length direction L, and a width direction W of multilayer ceramic capacitor 100 are shown, and these directions may be referred to in the following description. In the present preferred embodiment, a direction of lamination of a ceramic layers 1a in a capacitive element 1 described later is defined as height direction T.

Figure 1:
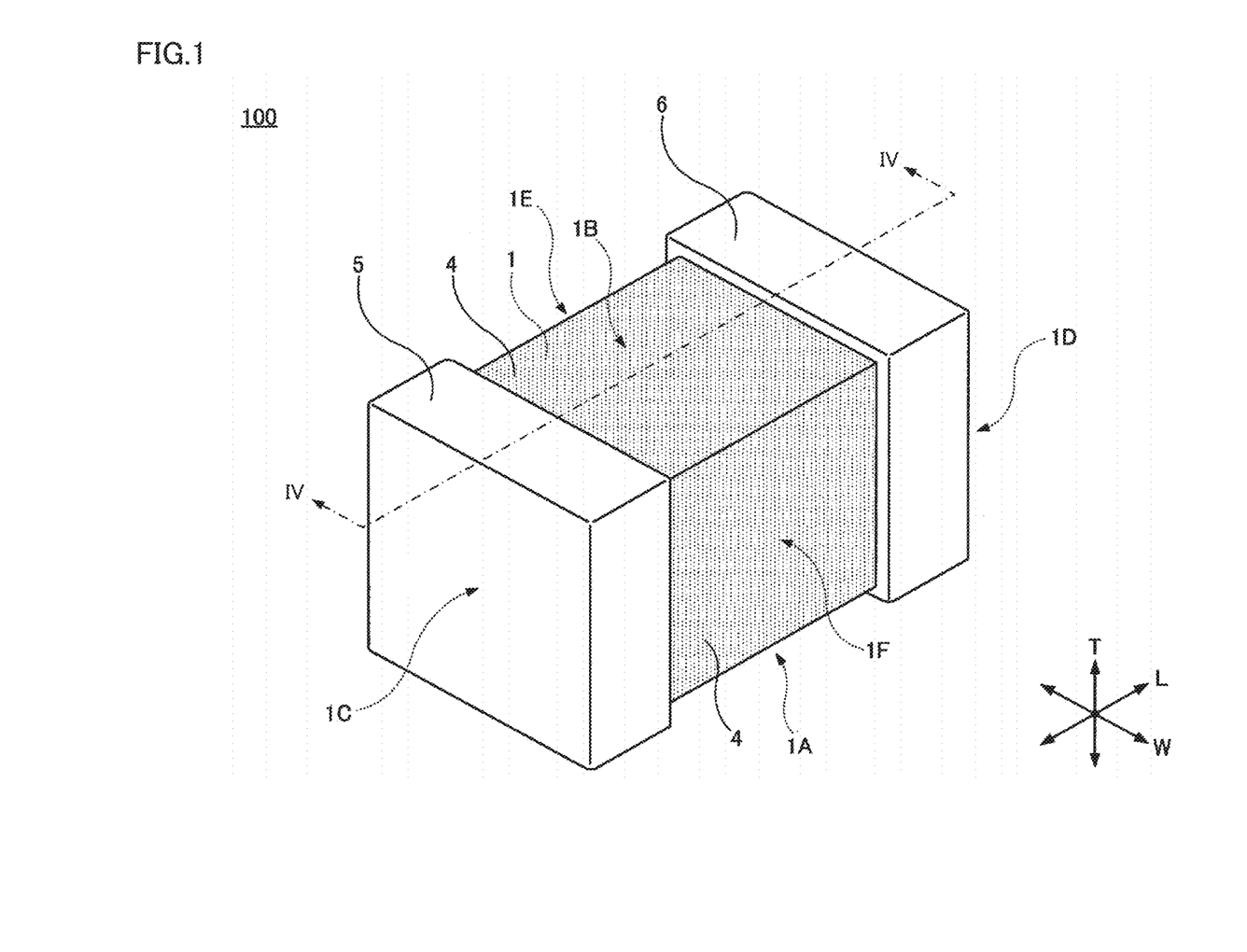
FIG. 1 is a perspective view of a multilayer ceramic capacitor 100 according to a first preferred embodiment of the present invention.
Figure 2A:
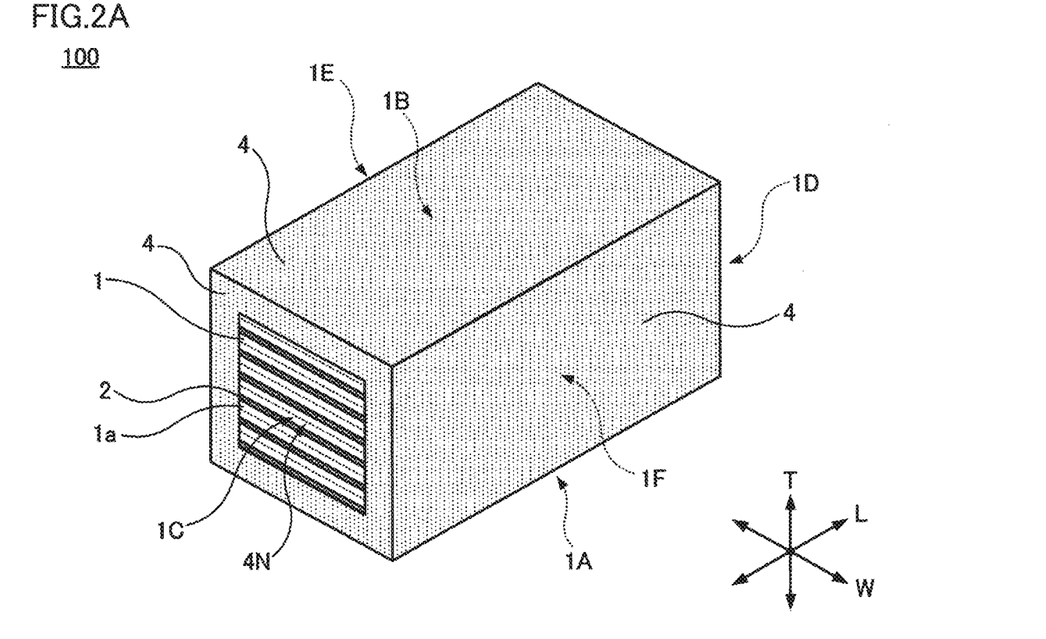
FIGS. 2A and 2B are exploded perspective views of multilayer ceramic capacitor 100, respectively.
Figure 2B:
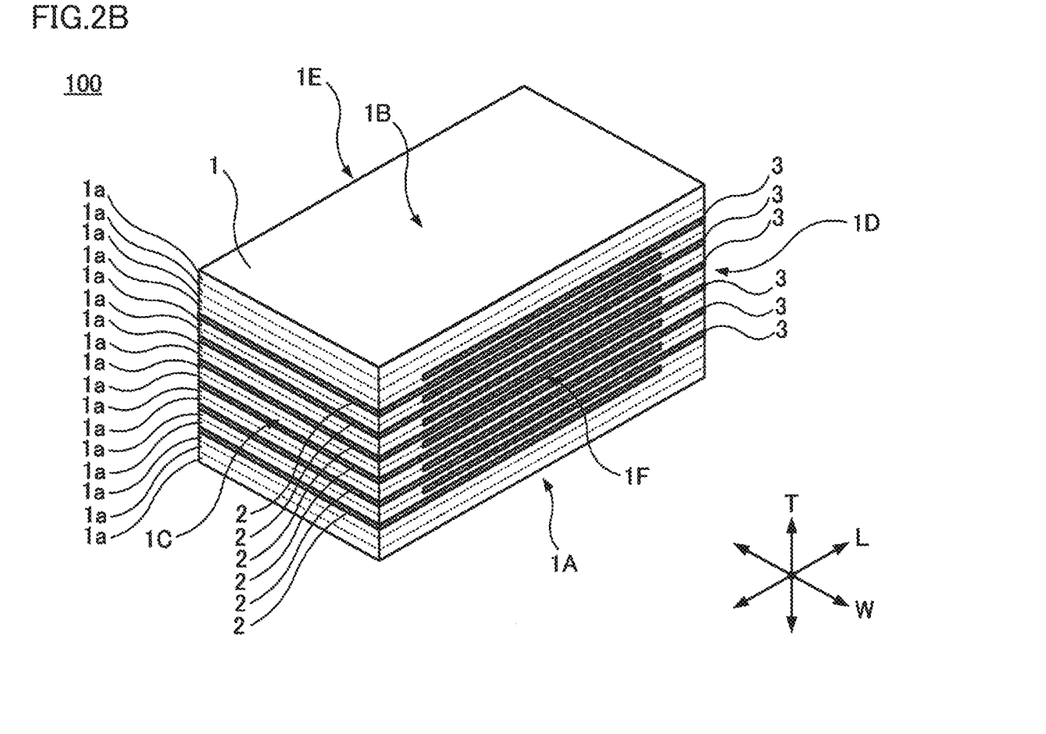
Figure 3A:
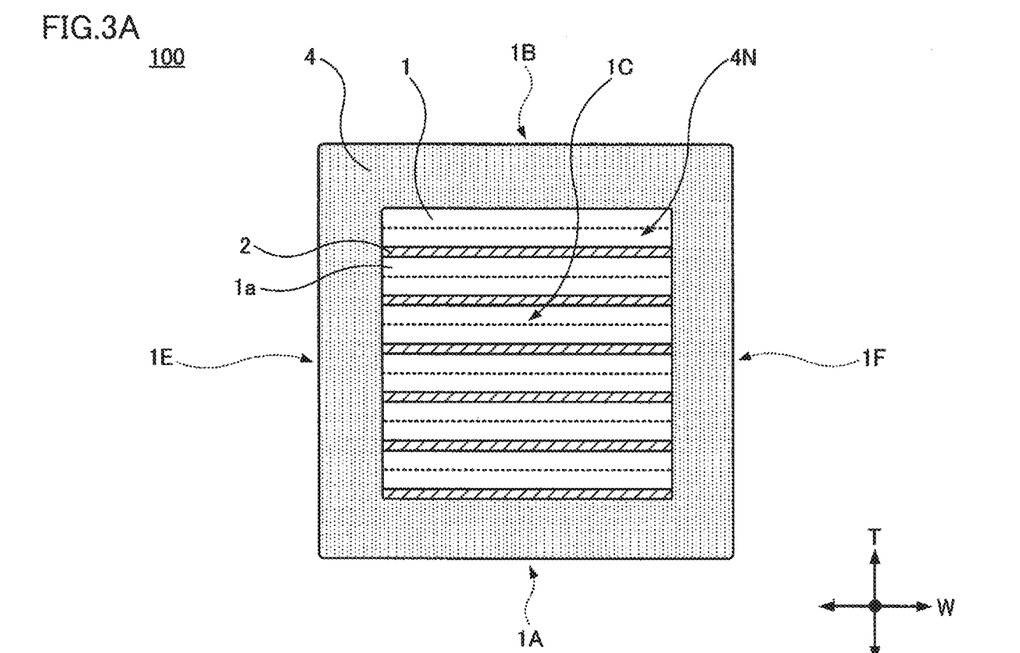
FIGS. 3A and 3B are exploded front views of multilayer ceramic capacitor 100, respectively.
Figure 3B:
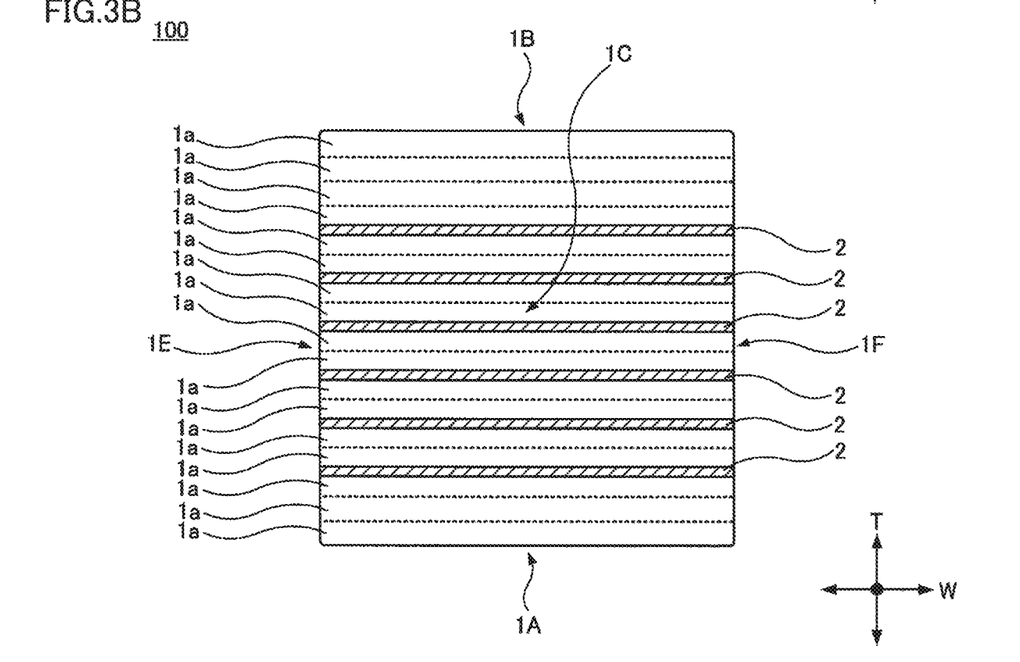
Figure 4:
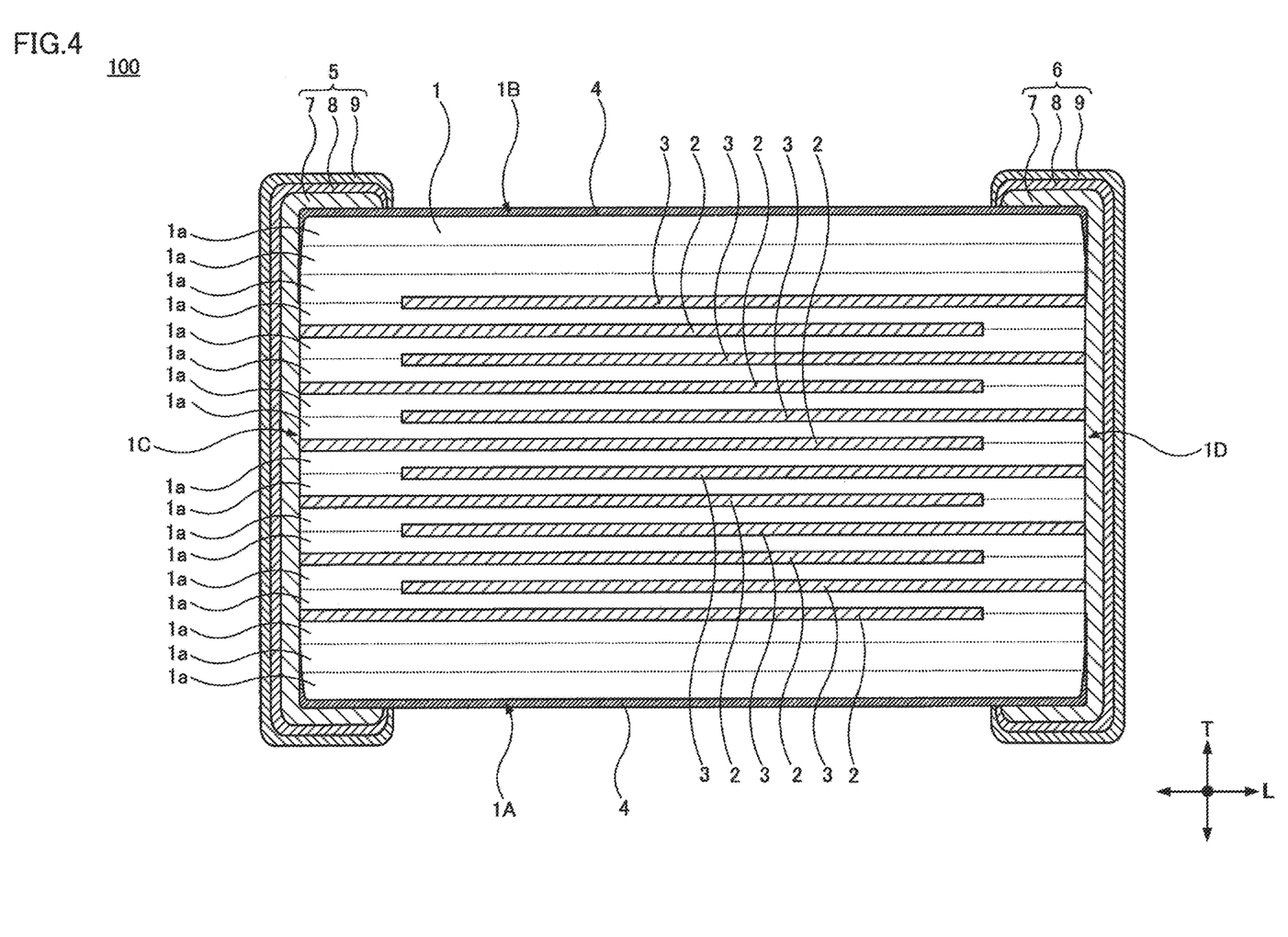
FIG. 4 is a cross-sectional view of multilayer ceramic capacitor 100.
Figure 5:
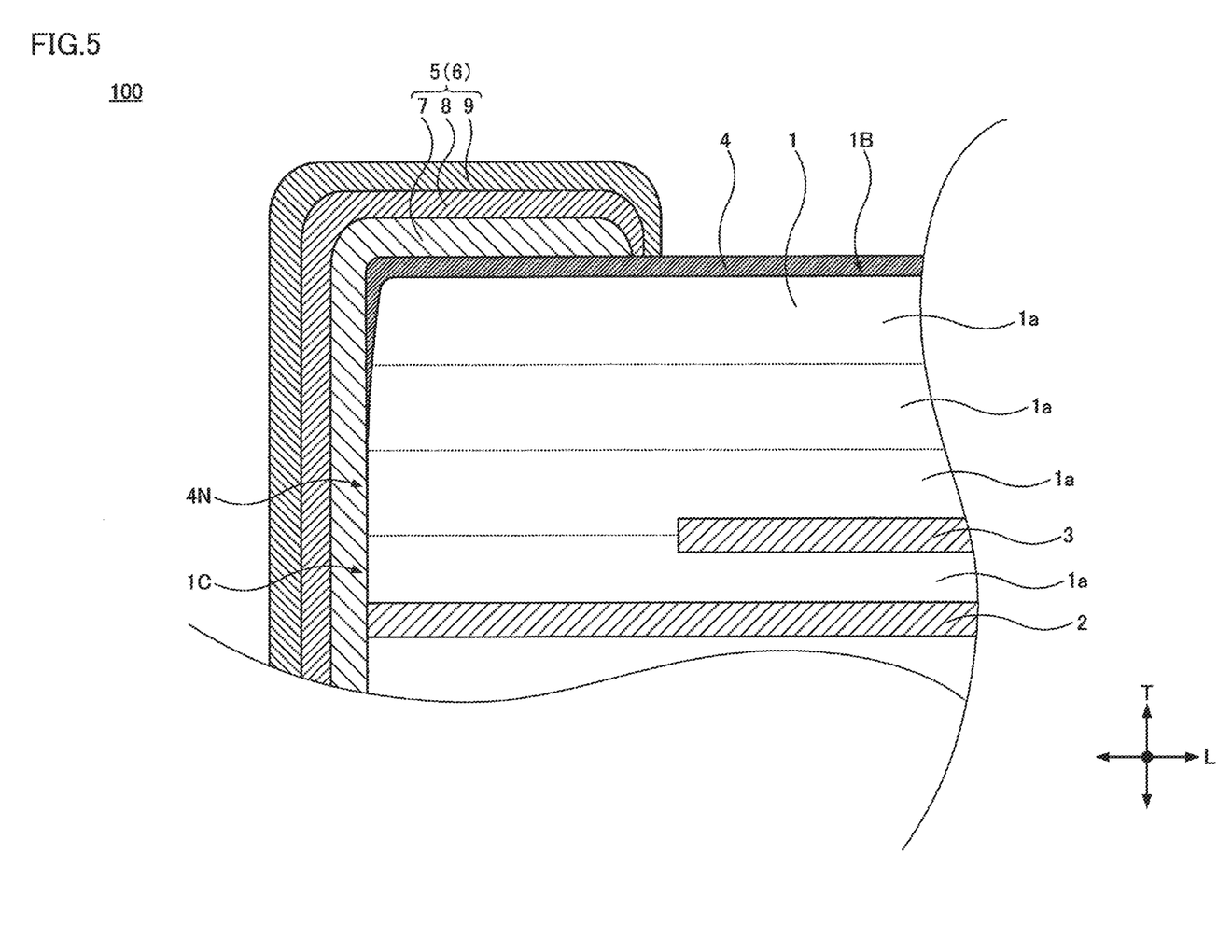
FIG. 5 is a cross-sectional view of a main portion of multilayer ceramic capacitor 100.

FIG. 1 is a perspective view of multilayer ceramic capacitor 100. FIG. 2A is an exploded perspective view illustrating a state in which a first external electrode 5 and a second external electrode 6 that are to be described later are omitted from multilayer ceramic capacitor 100. FIG. 2B is also an exploded perspective view illustrating a state in which first external electrode 5, second external electrode 6, and $SiO_2$ films 4 that are to be described later are omitted from multilayer ceramic capacitor 100. FIG. 3A is an exploded front view illustrating a first end surface 1C of capacitive element 1 to be described later with first external electrode 5 and second external electrode 6 being omitted from multilayer ceramic capacitor 100. FIG. 3B is also an exploded front view illustrating first end surface 1C of capacitive element 1 with first external electrode 5, second external electrode 6, and $SiO_2$ films 4 being omitted from multilayer ceramic capacitor 100. FIG. 4 is a cross-sectional view of multilayer ceramic capacitor 100, illustrating a cross-sectional view taken along line IV-IV in FIG. 1. FIG. 5 is a cross-sectional view of a main portion of multilayer ceramic capacitor 100.

As can be seen from FIG. 2B and the like, multilayer ceramic capacitor 100 includes capacitive element 1 in which a plurality of ceramic layers 1a, a plurality of first internal electrodes 2, and a plurality of second internal electrodes 3 are laminated.

A number of layers of ceramic layers 1a, a number of layers of first internal electrodes 2, and a number of layers of second internal electrodes 3 are not particularly limited. Each of first internal electrodes 2 and second internal electrodes 3 are laminated between ceramic layers 1a. In principle, first internal electrodes 2 and second internal electrodes 3 are alternately laminated, but there may be exceptions. In addition, there may be an interlayer between ceramic layers 1a in which neither first internal electrodes 2 nor second internal electrodes 3 is laminated.

Capacitive element 1 includes a first main surface 1A and a second main surface 1B opposed to each other in height direction T, a first end surface 1C and a second end surface 1D opposed to each other in length direction L orthogonal or substantially orthogonal to height direction T, and a first side surface 1E and a second side surface 1F opposed to each other in width direction W orthogonal or substantially orthogonal to height direction T and length direction L.

As shown in FIG. 2B, first internal electrodes 2 have a rectangular or substantially rectangular shape including two end portions facing each other in width direction W and two end portions facing each other in length direction L, one of the end portions facing each other in width direction W is exposed to first side surface 1E, the other of the end portions facing each other in width direction W is exposed to second side surface 1F, and one of the end portions facing each other in length direction L extends to first end surface 1C.

Second internal electrodes 3 have a rectangular or substantially rectangular shape including two end portions facing each other in width direction W and two end portions facing each other in length direction L, one of the end portions facing each other in width direction W is exposed to first side surface 1E, the other of the end portions facing each other in width direction W is exposed to second side surface 1F, and one of the end portions facing each other in length direction L extends to second end surface 1D.

A dimension of first internal electrodes 2 in width direction W and a dimension of second internal electrodes 3 in width direction W are the same or substantially the same as a dimension of ceramic layers 1a in width direction W. A dimension of first internal electrodes 2 in length direction L and a dimension of second internal electrodes 3 in length direction L are smaller than a dimension of ceramic layers 1a in length direction L.

A material of capacitive element 1 (ceramic layers 1a) is not particularly limited, and for example, a dielectric ceramic including $BaTiO_3$ as a main component can be used. However, instead of $BaTiO_3$, a dielectric ceramic mainly including another material such as, for example, $CaTiO_3$, $SrTiO_3$, or $CaZrO_3$ may be used. A thickness of ceramic layers 1a is not particularly limited, and is, for example, about 0.1 μm to about 1.0 μm.

The main components of first internal electrodes 2 and second internal electrodes 3 are not particularly limited, and for example, Ni can be used. However, other metals such as, for example, Pd, Ag, and Cu may be used instead of Ni. Ni, Pd, Ag, Cu, or the like may be an alloy with another metal. Thicknesses of first internal electrodes 2 and second internal electrodes 3 are not particularly limited, and are, for example, about 0.1 μm to about 1.0 μm.

As can be seen from FIG. 2A and the like, $SiO_2$ films 4 are provided on an outer surface of capacitive element 1. In the present preferred embodiment, $SiO_2$ films 4 are provided entirely or substantially entirely on first main surface 1A, entirely or substantially entirely on second main surface 1B, entirely on first side surface 1E, entirely or substantially entirely on second side surface 1F, on a portion of first end surface 1C, and on a portion of second end surface 1D of capacitive element 1.

SiO$_2$ films 4 provided on first side surface 1E and second side surface 1F of capacitive element 1 cover first internal electrodes 2 and second internal electrodes 3, respectively, so that first internal electrodes 2 and second internal electrodes 3 are not exposed to the outer surfaces. Further, SiO$_2$ films 4 provided on first side surface 1E and second side surface 1F of capacitive element 1 reduce or prevent moisture from entering the interior of capacitive element 1 from first side surface 1E and second side surface 1F of capacitive element 1, respectively. In the present preferred embodiment, SiO$_2$ films 4 are provided entirely or substantially entirely on first side surface 1E and entirely or substantially entirely on second side surface 1F of capacitive element 1, but may be provided partially as long as the above-described functions are performed.

SiO$_2$ films 4 provided on first end surface 1C and second end surface 1D of capacitive element 1 reduce or prevent moisture from entering the interior of capacitive element 1 from first end surface 1C and second end surface 1D of capacitive element 1, respectively. However, it is necessary to electrically connect first internal electrodes 2 to first external electrode 5 to be described later on first end surface 1C, and to electrically connect second internal electrodes 3 to second external electrode 6 to be described later on second end surface 1D. Therefore, SiO$_2$ films 4 are provided on a portion of first end surface 1C and a portion of second end surface 1D of capacitive element 1 so as not to hinder these electrical connections.

As illustrated in FIGS. 2A and 3A, in the present preferred embodiment, SiO$_2$ film 4 is annularly provided on first end surface 1C of capacitive element 1. Although not illustrated, SiO$_2$ film 4 is similarly provided in an annular shape on second end surface 1D of capacitive element 1. That is, SiO$_2$ films 4 provided on the first end surface 1C and second end surface 1D include an unprovided portion 4N of SiO$_2$ film 4 in the central portion. In the present preferred embodiment, unprovided portion 4N has a quadrangular or substantially quadrangular shape, but this shape is not particularly limited, and may be, for example, circular, substantially circular, elliptical or substantially elliptical, polygonal other than quadrangular, or the like.

In the present preferred embodiment, as described above, SiO$_2$ films 4 are also provided entirely or substantially entirely on first main surface 1A and entirely or substantially entirely on second main surface 1B of capacitive element 1. This is to provide SiO$_2$ films 4 integrally on first main surface 1A and second main surface 1B in addition to first side surface 1E, second side surface 1F, first end surface 1C, and second end surface 1D, and strongly bonding SiO$_2$ film 4 to capacitive element 1. Further, SiO$_2$ films 4 provided on first main surface 1A and second main surface 1B also reduce or prevent moisture from entering the interior of capacitive element 1. SiO$_2$ films 4 provided on first main surface 1A and second main surface 1B are not necessary configurations in the present invention, and can be omitted. Further, SiO$_2$ films 4 provided on first main surface 1A and second main surface 1B may be provided partially instead of entirely.

The thickness of SiO$_2$ films 4 is not particularly limited, but is preferably as small as possible as long as strength can be maintained and moisture resistance can be maintained. From this viewpoint, a maximum thickness of SiO$_2$ films 4 at each formation site is preferably, for example, greater than or equal to about 1 μm and less than or equal to about 5 μm. This is because strength and/or moisture resistance is deteriorated when the thickness is less than about 1 μm. Further, the thickness larger than about 5 μm is larger than necessary.

In a conventional multilayer ceramic capacitor in which the dimension in the width direction of the first internal electrodes and the second internal electrodes and the dimension in the width direction of the ceramic layers are the same, the thickness of a side gap ceramic layer provided on the side surface of the capacitive element is, for example, about 15 μm to about 20 μm. Therefore, when SiO$_2$ films 4 are provided on first side surface 1E and second side surface 1F of capacitive element 1 instead of the side gap ceramic layer as in preferred embodiments of the present invention, the dimension of the multilayer ceramic capacitor in width direction W can be reduced. Alternatively, if the dimension in width direction W of the multilayer ceramic capacitor is constant or substantially constant, the dimension of first internal electrodes 2 in width direction W, the dimension of the second internal electrodes in width direction W, and the dimension of ceramic layers 1a in width direction W can be increased, and thus a capacitance can be increased.

As illustrated in FIGS. 1 and 4, and the like, first external electrode 5 is provided on the outer surface of first end surface 1C of capacitive element 1 on which SiO$_2$ film 4 is not provided and the outer surface of the SiO$_2$ film provided on first end surface 1C. Similarly, second external electrode 6 is provided on the outer surface of second end surface 1D of capacitive element 1 on which SiO$_2$ film 4 is not provided and the outer surface of SiO$_2$ film 4 provided on second end surface 1D.

In the present preferred embodiment, first external electrode 5 has a cap shape, and extends from first end surface 1C onto SiO$_2$ films 4 provided on each of first main surface 1A, second main surface 1B, first side surface 1E, and second side surface 1F. Similarly, second external electrode 6 also has a cap shape, and extends from second end surface 1D onto SiO$_2$ films 4 provided on each of first main surface 1A, second main surface 1B, first side surface 1E, and second side surface 1F.

First internal electrodes 2 extending to first end surface 1C of capacitive element 1 are electrically connected to first external electrode 5. Second internal electrodes 3 extending to second end surface 1D of capacitive element 1 are electrically connected to second external electrode 6.

First external electrode 5 and second external electrode 6 are made of the same material (main component) and have the same or substantially the same structure. The material and the structure of first external electrode 5 and second external electrode 6 are not particularly limited, but in the present preferred embodiment, have a three-layer structure including an underlayer external electrode layer 7, a first plating layer 8, and a second plating layer 9.

In the present preferred embodiment, for example, Cu and glass are used as the component of underlayer external electrode layer 7. However, another metal such as, for example, Ag or Ni may be used instead of Cu. Cu, Ag, Ni, or the like may be an alloy with other metals. Underlayer external electrode layer 7 may not include glass. A thickness of underlayer external electrode layer 7 is not particularly limited, and is, for example, about 2 μm to about 100 μm.

In the present preferred embodiment, for example, first plating layer 8 is a Ni plating layer, and second plating layer 9 is a Sn plating layer. A thickness of first plating layer 8 and second plating layer 9 is not particularly limited, and is, for example, about 0.1 μm to about 5.0 μm.

In multilayer ceramic capacitor 100 according to the present preferred embodiment, since SiO$_2$ films 4 cover first internal electrodes 2 and second internal electrodes 3 on first side surface 1E and second side surface 1F of capacitive element 1, first internal electrodes 2 and second internal electrodes 3 are not exposed to the outer surface.

In multilayer ceramic capacitor 100 according to the present preferred embodiment, $SiO_2$ films 4 reduce or prevent moisture from entering the interior of capacitive element 1 from first main surface 1A, second main surface 1B, first side surface 1E, second side surface 1F, first end surface 1C, and second end surface 1D of capacitive element 1.

Example of Method for Manufacturing Multilayer Ceramic Capacitor

Multilayer ceramic capacitor 100 according to the first preferred embodiment can be manufactured, for example, by a method shown in FIGS. 6A to 6D.

(1) Preparation of Capacitive Element 1

Figure 6A:
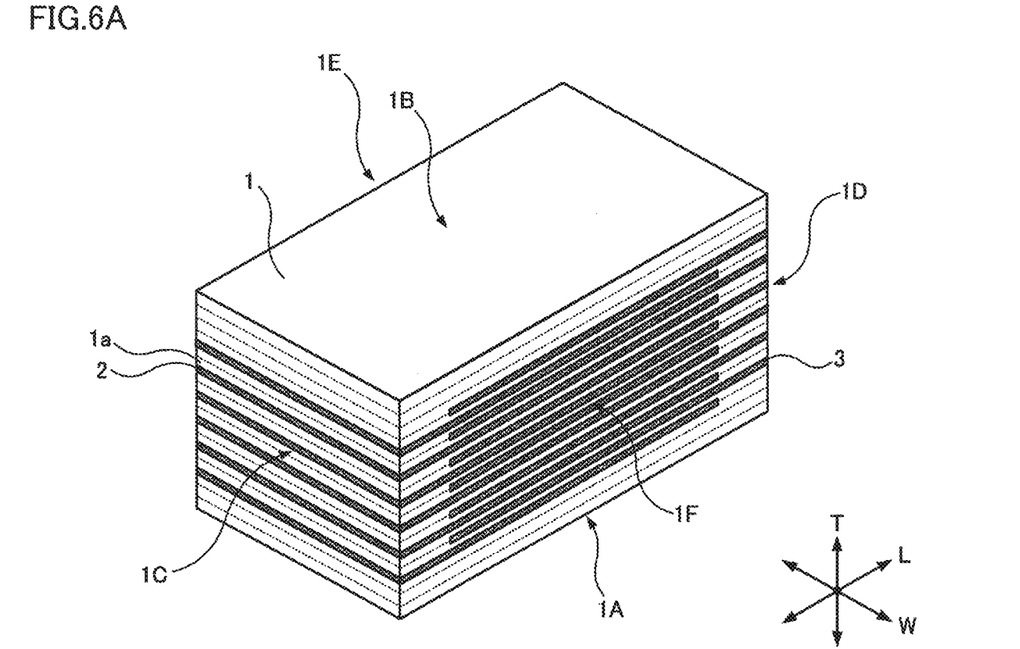
FIGS. 6A to 6D are explanatory views each showing a step included in an example of a method for manufacturing multilayer ceramic capacitor 100 according to a preferred embodiment of the present invention.

Capacitive element 1 shown in FIG. 6A is prepared. Capacitive element 1 can be prepared, for example, by the following method.

Although not shown, first, a powder of dielectric ceramic, a binder resin, a solvent, and the like are prepared, and these are wet-mixed to prepare ceramic slurry.

Next, the ceramic slurry is applied onto a carrier film in a form of a sheet using, for example, a die coater, a gravure coater, a micro gravure coater, or the like, and dried to prepare a mother ceramic green sheet. The mother ceramic green sheet is a ceramic green sheet including a large number of ceramic green sheets for ceramic layers 1a in a planar direction in order to collectively manufacture a large number of multilayer ceramic capacitors.

Next, in order to form first internal electrodes 2 on a main surface of a predetermined mother ceramic green sheet, a conductive paste prepared in advance is printed in a desired pattern. In order to form second internal electrodes 3 on a main surface of another predetermined mother ceramic green sheet, a conductive paste prepared in advance is printed in a desired pattern. In capacitive element 1, the conductive paste is not printed on the mother ceramic green sheets for preparing ceramic layers 1a for protective layers laminated on top and bottom.

Next, the mother ceramic green sheets are laminated in a predetermined order and integrated by thermocompression to prepare an unfired mother capacitive element.

Next, the unfired mother capacitive element is cut into a plurality of individual unfired capacitive elements.

Next, barrel-polishing is performed on the unfired capacitive elements. The barrel-polishing is performed to round ridgelines of the unfired capacitive elements so as not to damage each other even if the unfired capacitive elements collide with each other. At this time, when the end surface of the unfired capacitive element is viewed, a height of a central region of the end surface is higher than a height of an outer region of the end surface.

Next, the unfired capacitive elements are fired with a desired profile. As a result, each of the unfired capacitive elements becomes capacitive element 1 in which the plurality of ceramic layers 1a, the plurality of first internal electrodes 2, and the plurality of second internal electrodes 3 are laminated. First internal electrodes 2 and second internal electrodes 3 are exposed on first side surface 1E and second side surface 1F of capacitive element 1.

(2) (Optional Step) Barrel-Polishing to Capacitive Element 1

Next, if necessary, barrel-polishing is performed on capacitive element 1 after firing. When first end surface 1C and second end surface 1D of capacitive element 1 are viewed after barrel-polishing, the height of the central region is higher than the height of the outer region.

(3) Application of Tetraethoxysilane (TEOS) to Outer Surface of Capacitive Element 1

Figure 6B:
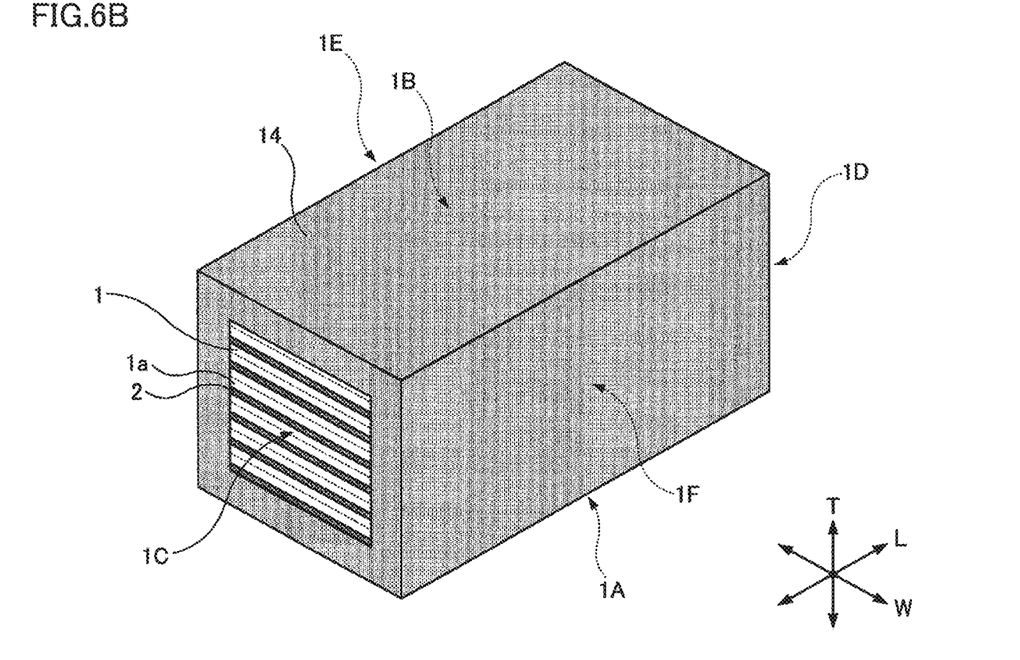

Next, as shown in FIG. 6B, tetraethoxysilane (TEOS) 14 is applied to the entire or substantially the entire first main surface 1A, the entire or substantially the entire second main surface 1B, the entire or substantially the entire first side surface 1E, the entire or substantially the entire second side surface 1F, a portion of first end surface 1C, and a portion of second end surface 1D of capacitive element 1. Tetraethoxysilane 14 can be applied to the outer surface of capacitive element 1 by, for example, a method shown in FIGS. 7A to 7C.

Figure 7A:
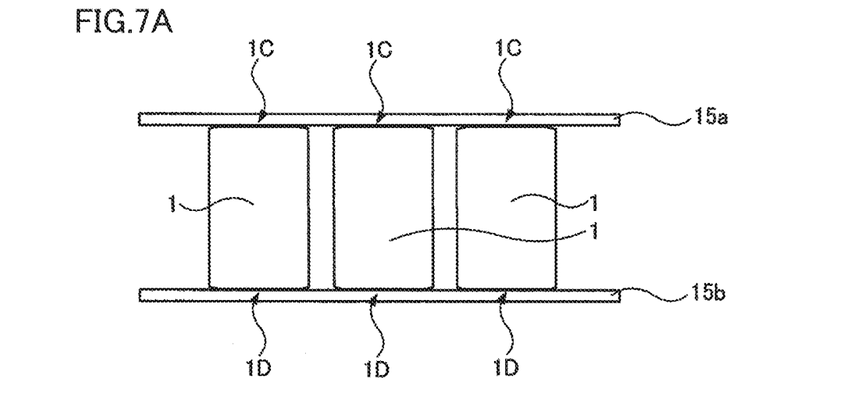
FIGS. 7A to 7C are explanatory views each showing a step of applying tetraethoxysilane to an outer surface of a capacitive element 1 in the example of the method for manufacturing multilayer ceramic capacitor 100 according to a preferred embodiment of the present invention.

First, as illustrated in FIG. 7A, the plurality of capacitive elements 1 are held between a pair of jigs 15a and 15b. More specifically, capacitive element 1 is held with first end surface 1C and second end surface 1D in contact with jigs 15a and 15b. Although details of jigs 15a and 15b are not particularly limited, it is preferable that surfaces in contact with capacitive element 1 have adhesiveness. Jigs 15a and 15b are provided by forming an adhesive layer on a surface of a metal plate, for example. Alternatively, jigs 15a and 15b are made of, for example, plate-shaped rubber having adhesiveness on the surface and having a certain degree of hardness. Alternatively, jigs 15a and 15b may be, for example, adhesive sheets having a certain degree of hardness and having adhesiveness on their surfaces.

The plurality of capacitive elements 1 can be held by jigs 15a and 15b by, for example, the following method. First, a plate (not illustrated) including a plurality of storage portions provided on a main surface is prepared. Next, capacitive elements 1 are respectively provided in the plurality of storage portions. At this time, first end surface 1C or second end surface 1D of capacitive element 1 is brought into contact with a bottom of the housing portion. Next, jig 15a is attached to first end surface 1C or second end surface 1D exposed from the storage portion of the plurality of capacitive elements 1 stored in the storage portion (jig 15a and capacitive elements 1 are adhered to each other due to the adhesiveness of the surface of jig 15a). Next, the plurality of capacitive elements 1 attached to jig 15a is taken out from the plate. Next, jig 15b is attached to first end surface 1C or second end surface 1D that is not attached to jig 15a of the plurality of capacitive elements 1. As a result, the plurality of capacitive elements 1 can be held between the pair of jigs 15a and 15b.

As described above, the height of the central region of first end surface 1C and second end surface 1D of capacitive element 1 is higher than the height of the outer region by barrel-polishing to the unfired capacitive element when capacitive element 1 is manufactured and/or barrel-polishing to capacitive element 1 after capacitive element 1 is manufactured. Therefore, first end surface 1C and second end surface 1D of capacitive element 1 are attached to jigs 15a and 15b in the central region, and the outer region is not attached to jigs 15a and 15b, and a gap is provided.

Figure 7B:
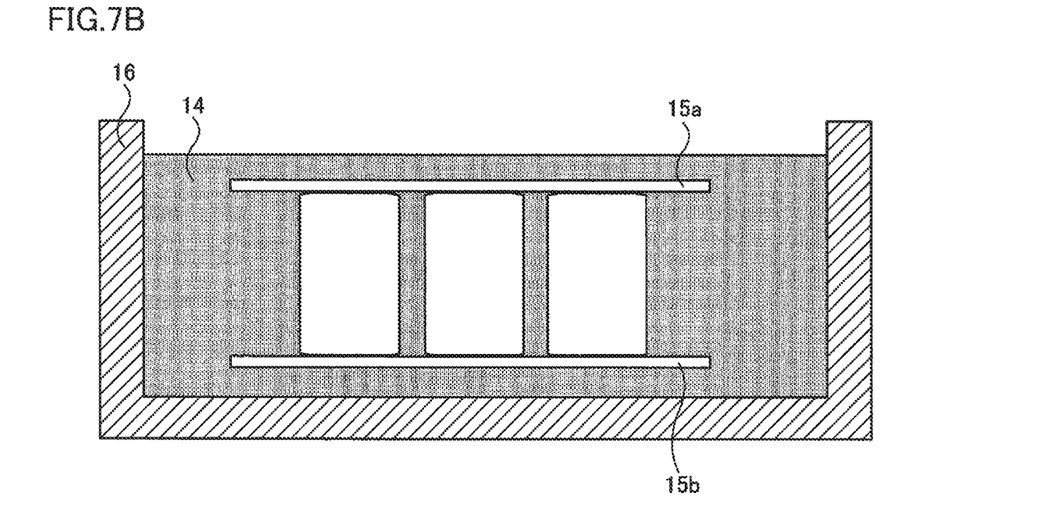

Next, as shown in FIG. 7B, tetraethoxysilane 14 is prepared and stored in a bath 16. Tetraethoxysilane 14 may be prepared alone. Alternatively, tetraethoxysilane 14 may be prepared in a state of being mixed with another liquid. For example, tetraethoxysilane 14 may be prepared in a state of being mixed with methyltriethoxysilane (MTES) in which a portion of an ethoxy group is substituted with a methyl group, or the like.

Subsequently, as also shown in FIG. 7B, the plurality of capacitive elements 1 held between jigs 15a and 15b are immersed in tetraethoxysilane 14 in bath 16.

Figure 7C:
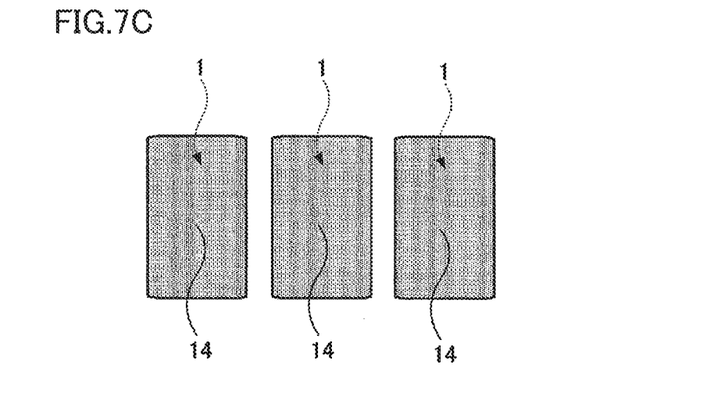

Next, the plurality of capacitive elements 1 held between jigs 15a and 15b are taken out from tetraethoxysilane 14 in bath 16. Subsequently, as illustrated in FIG. 7C, capacitive elements 1 are removed from jigs 15a and 15b.

As a result, as shown in FIG. 6B, tetraethoxysilane 14 is applied to the entire or substantially the entire first main surface 1A, the entire or substantially the entire second main surface 1B, the entire or substantially the entire first side surface 1E, the entire or substantially the entire second side surface 1F, a portion of first end surface 1C, and a portion of second end surface 1D of capacitive element 1. On first end surface 1C and second end surface 1D of capacitive element 1, tetraethoxysilane 14 is applied annularly only to the outer region where there is the gap with jigs 15a and 15b.

As can be seen from this, by holding capacitive element 1 between jigs 15a and 15b, in capacitive element 1, a portion to which tetraethoxysilane 14 is applied is exposed outside, and a portion to which tetraethoxysilane 14 is not applied is covered by jigs 15a and 15b. That is, jigs 15a and 15b function as masking when capacitive element 1 is immersed in tetraethoxysilane 14 in bath 16.

(4) Formation of $SiO_2$ Film 4 (Hydrolysis of Tetraethoxysilane (TEOS))

Figure 6C:
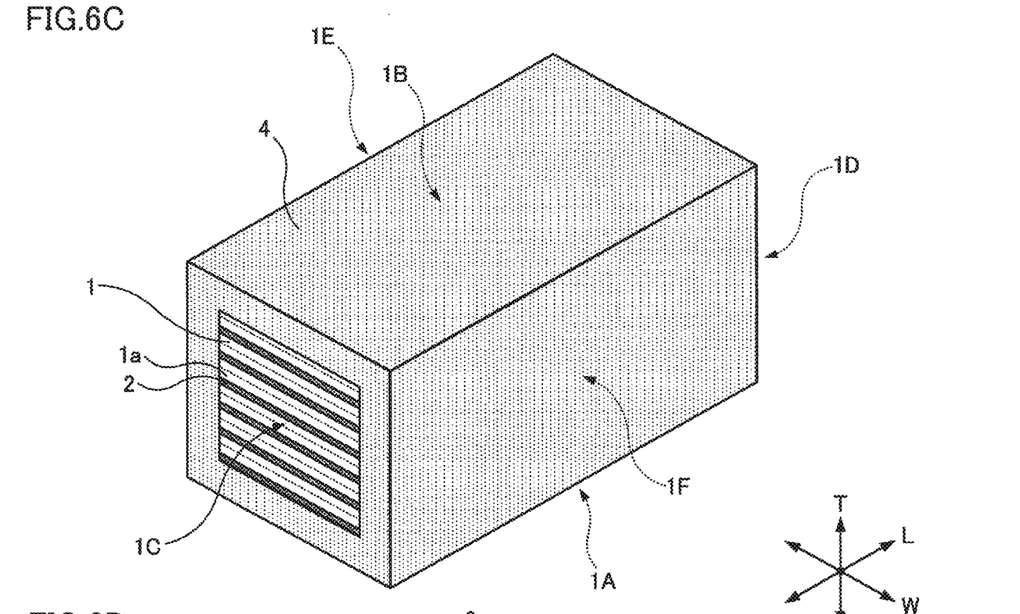

Next, as illustrated in FIG. 6C, tetraethoxysilane applied to the outer surface of capacitive element 1 is hydrolyzed and $SiO_2$ films 4 are formed on the entire or substantially the entire first main surface 1A, the entire or substantially the entire second main surface 1B, the entire or substantially the entire first side surface 1E, the entire or substantially the entire second side surface 1F, a portion of first end surface 1C, and a portion of second end surface 1D of capacitive element 1. Although a hydrolysis condition is not particularly limited, in the present preferred embodiment, capacitive element 1 coated with tetraethoxysilane was left for about 60 minutes in an environment of a temperature higher than or equal to about 60° C. and a humidity higher than or equal to about 90%. As a result, the tetraethoxysilane applied to capacitive element 1 was decomposed into ethanol and $SiO_2$, and $SiO_2$ films 4 were formed on the entire or substantially the entire first main surface 1A, the entire or substantially the entire second main surface 1B, the entire or substantially the entire first side surface 1E, the entire or substantially the entire second side surface 1F, a portion of first end surface 1C, and a portion of second end surface 1D of capacitive element 1.

(5) Formation of First External Electrode 5 and Second External Electrode 6

Figure 6D:
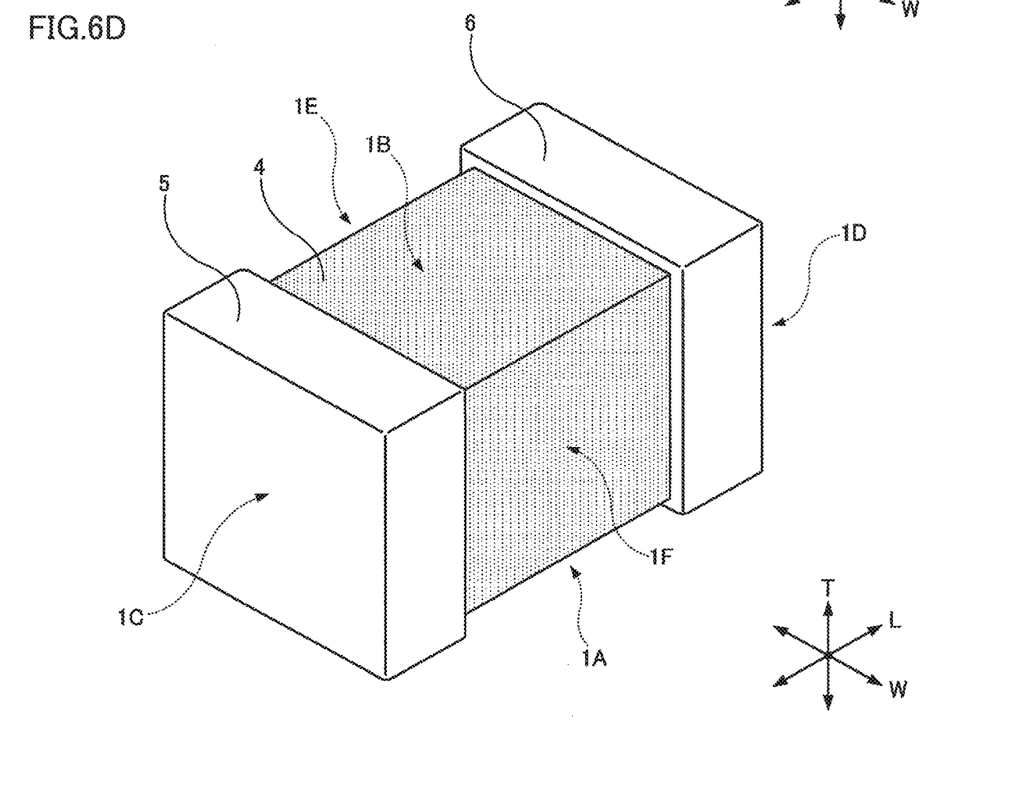

Next, as shown in FIG. 6D, first external electrode 5 is provided at one end, and second external electrode 6 is provided at the other end of capacitive element 1. In the present preferred embodiment, first, a conductive paste including Cu as a main component is applied to both ends of capacitive element 1, and baked to form underlayer external electrode layer 7. Next, a Ni plating layer is provided as first plating layer 8 on underlayer external electrode layer 7. Next, an Sn plating layer is provided as second plating layer 9 on first plating layer 8. Thus, multilayer ceramic capacitor 100 according to the first preferred embodiment is completed.

According to the non-limiting example of a method for manufacturing multilayer ceramic capacitor 100 of the present preferred embodiment, even though the dimensions in width direction W of first internal electrodes 2 and second internal electrodes 3 are the same or substantially the same as the dimensions in width direction W of ceramic layers 1a in multilayer ceramic capacitor 100, multilayer ceramic capacitor 100 can be easily manufactured with high productivity. This is because as compared with a conventional method for providing the side gap ceramic layer on the side surface of the capacitive element, $SiO_2$ films 4 can be provided very easily on first side surface 1E and second side surface 1F of capacitive element 1 according to the non-limiting example of a method for manufacturing multilayer ceramic capacitor 100 of the present preferred embodiment. According to the non-limiting example of a method for manufacturing multilayer ceramic capacitor 100 of the present preferred embodiment, $SiO_2$ films 4 can be collectively provided on first side surface 1E and second side surface 1F of a large number of capacitive elements 1.

Second Preferred Embodiment

Figure 8:
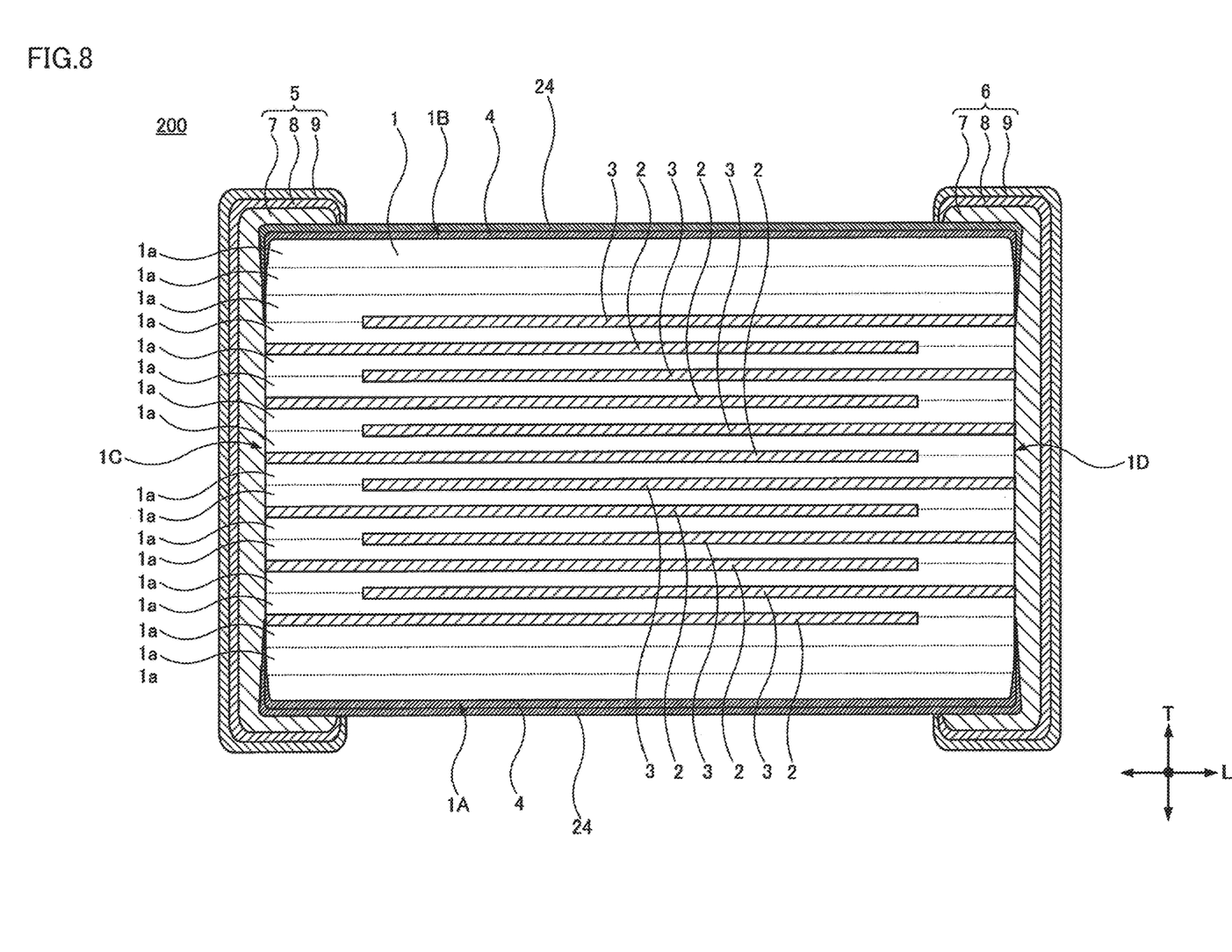
FIG. 8 is a cross-sectional view of a multilayer ceramic capacitor 200 according to a second preferred embodiment of the present invention.

FIG. 8 shows a multilayer ceramic capacitor 200 according to a second preferred embodiment of the present invention. FIG. 8 is a cross-sectional view of multilayer ceramic capacitor 200.

In multilayer ceramic capacitor 200 according to the second preferred embodiment, a new configuration is added to the configuration of multilayer ceramic capacitor 100 according to the first preferred embodiment described above. Specifically, in multilayer ceramic capacitor 100, $SiO_2$ films 4 are provided entirely or substantially entirely on first main surface 1A, entirely on second main surface 1B, entirely or substantially entirely on first side surface 1E, entirely or substantially entirely on second side surface 1F, on a portion of first end surface 1C, and on a portion of second end surface 1D of capacitive element 1. In multilayer ceramic capacitor 200, a $TiO_2$ film 24 is further provided on $SiO_2$ films 4. In the present preferred embodiment, $TiO_2$ film 24 is provided entirely or substantially entirely on the surfaces of $SiO_2$ films 4, but it is not necessary to provide $TiO_2$ film 24 entirely or substantially entirely on the surfaces of $SiO_2$ films 4, and the $TiO_2$ film may be provided at least partially.

$TiO_2$ film 24 can be provided on $SiO_2$ films 4 by, for example, the following method. First, $SiO_2$ films 4 are provided entirely or substantially entirely on first main surface 1A, entirely or substantially entirely on second main surface 1B, entirely on first side surface 1E, entirely or substantially entirely on second side surface 1F, on a portion of first end surface 1C, and on a portion of second end surface 1D of capacitive element 1 by the method for manufacturing multilayer ceramic capacitor 100 described above. Next, jigs 15a and 15b are prepared again, and the plurality of capacitive elements 1 on which $SiO_2$ films 4 are provided are held between jigs 15a and 15b. Next, a $TiO_2$ film is deposited on $SiO_2$ films 4 of capacitive element 1 held between jigs 15a and 15b. Finally, capacitive element 1 held between jigs 15a and 15b is heated, and the deposited $TiO_2$ film is fixed and $TiO_2$ film 24 is formed on $SiO_2$ films 4.

$SiO_2$ films 4 have high moisture resistance, but are often weak against corrosion by a solvent or a plating solution. In multilayer ceramic capacitor 200, $TiO_2$ film 24 can reduce or prevent corrosion of capacitive element 1 (including first internal electrodes 2 and second internal electrodes 3) due to a solvent or a plating solution.

The multilayer ceramic capacitors 100 and 200 according to the preferred embodiments have been described above. However, the present invention is not limited to the contents described above, and various modifications can be made in accordance with the spirit of the invention.

For example, in the multilayer ceramic capacitors 100 and 200, the shape of unprovided portions 4N of $SiO_2$ films 4 provided annularly on first end surface 1C and second end surface 1D of capacitive element 1 is quadrangular or substantially quadrangular, but the shape of unprovided portions 4N is not particularly limited, and may be circular, substantially circular, elliptical, substantially elliptical, or polygonal other than quadrangular or substantially quadrangular.

Further, in the multilayer ceramic capacitors 100 and 200, $SiO_2$ films 4 are provided on first main surface 1A and second main surface 1B of capacitive element 1, but these $SiO_2$ films 4 may be omitted.

In the multilayer ceramic capacitors 100 and 200, $SiO_2$ films 4 are provided entirely or substantially entirely on first side surface 1E and entirely or substantially entirely on second side surface 1F of capacitive element 1, but these $SiO_2$ films 4 may be provided partially as long as first internal electrodes 2 and second internal electrodes 3 can be covered.

A multilayer ceramic capacitor according to a preferred embodiment of the present invention is as described in the "SUMMARY OF THE INVENTION".

In this multilayer ceramic capacitor, the $SiO_2$ films are preferably provided entirely or substantially entirely on the first side surface and entirely or substantially entirely on the second side surface. In this case, it is possible to more reliably reduce or prevent moisture from entering the interior of the capacitive element from the first side surface and the second side surface of the capacitive element.

Preferably, the $SiO_2$ films are provided on the entire or substantially the entire first main surface and the entire or substantially the entire second main surface of the capacitive element. In this case, $SiO_2$ films 4 can wrap capacitive element 1, and $SiO_2$ films 4 are strongly bonded to capacitive element 1.

It is also preferable that the $SiO_2$ films are annularly provided on the first end surface or/and the second end surface, when the first end surface or/and the second end surface of the capacitive element are viewed with the first external electrode and the second external electrode being removed. In this case, it is possible to reduce or prevent moisture from entering the interior of the capacitive element from the first end surface and the second end surface of the capacitive element, while reducing or preventing deterioration of the electrical junction between the first internal electrodes and the first external electrode and the electrical junction between the second internal electrodes and the second external electrode.

It is also preferable that the maximum thickness of the $SiO_2$ film provided on the first side surface and the $SiO_2$ film provided on the second side surface of the capacitive element is, for example, greater than or equal to about 1 μm and less than or equal to about 5 μm. This is because when the thickness is less than about 1 μm, the strength and moisture resistance of the $SiO_2$ films are deteriorated. Further, the thickness larger than about 5 μm becomes larger than necessary.

It is also preferable that the $TiO_2$ film is provided on at least a portion of the outer surface of the $SiO_2$ film. In this case, the $TiO_2$ film can reduce or prevent corrosion of the capacitive element (including first internal electrodes and second internal electrodes) due to a solvent or a plating solution.

It is also preferable that at least a single-layer plating layer is provided on the outer surface of the first external electrode and the outer surface of the second external electrode. For example, when a Ni plating layer as the first plating layer and a Sn plating layer as the second plating layer are provided on the underlayer electrode layer, solder heat resistance can be improved by the Ni plating layer, and solderability can be improved by the Sn plating layer.

A non-limiting example of a method for manufacturing a multilayer ceramic capacitor according to a preferred embodiment of the present invention is as described in the "SUMMARY OF THE INVENTION".

In the non-limiting example of a method for manufacturing a multilayer ceramic capacitor, it is preferable that the applying the solution including the tetraethoxysilane to the desired portion of the outer surface of the capacitive element includes immersing the capacitive element in the solution containing tetraethoxysilane after masking a portion of the capacitive element at which the $SiO_2$ films are not provided. In this case, tetraethoxysilane can be extremely efficiently applied to a desired portion of the outer surface of the capacitive element.

It is also preferable that the preparing the capacitive element includes preparing an unfired capacitive element, barrel-polishing the unfired capacitive element, and firing the unfired capacitive element. In this case, in the first end surface and the second end surface of the capacitive element, the height of the central region is higher than the height of the outer region.

It is also preferable that barrel-polishing the capacitive element is included, after the preparing the capacitive element, and before the applying the solution containing the tetraethoxysilane to the desired portion of the outer surface of the capacitive element. In this case, in the first end surface and the second end surface of the capacitive element, the height of the central region is further higher than the height of the outer region.

It is also preferable that a step of forming a $TiO_2$ film on at least a portion of outer surfaces of the $SiO_2$ films is included, after the step of forming the $SiO_2$ films on the desired portions of the outer surface of the capacitive element, and before the step of forming the first external electrode and the second external electrode. In this case, the $TiO_2$ film can reduce or prevent corrosion of the capacitive element (including first internal electrodes and second internal electrodes) due to a solvent or a plating solution. The step of forming the $TiO_2$ film can be, for example, a step of depositing the $TiO_2$ film on the outer surfaces of the $SiO_2$ films and further heating the $TiO_2$ film.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a capacitive element including first and second main surfaces opposed to each other in a height direction, first and second end surfaces opposed to each other in a length direction orthogonal or substantially orthogonal to the height direction, and first and second side surfaces opposed to each other in a width direction orthogonal or substantially orthogonal to the height direction and the length direction;
   $SiO_2$ films provided on the capacitive element;
   first and second external electrodes provided on the capacitive element and the $SiO_2$ films; and
   first and second internal electrodes provided inside of the capacitive element; wherein the first internal electrodes are exposed on the first side surface, the second side surface, and the first end surface;

the SiO$_2$ films directly cover the first internal electrodes on the first side surface, the second side surface, and the first end surface;

the first external electrode is directly connected to the first internal electrodes on the first end surface;

the second internal electrodes are exposed on the first side surface, the second side surface, and the second end surface;

the SiO$_2$ films directly cover the second internal electrodes on the first side surface, the second side surface, and the second end surface;

the second external electrode is directly connected to the second internal electrodes on the second end surface;

the SiO$_2$ films directly covering the internal electrodes exposed on the side surfaces and the SiO$_2$ films directly covering the internal electrodes exposed on the end surfaces are directly connected on the first and second main surfaces, the first and second end surfaces, and the first and second side surfaces of the capacitive element; and a height in the length direction of a central region of the first and second end surfaces is higher than a height in the length direction of an outer region of the first and second end surfaces, and the SiO$_2$ films on the first and second end surfaces are thicker in the outer region than in the central region.

2. The multilayer ceramic capacitor according to claim 1, wherein the SiO$_2$ films are provided entirely or substantially entirely on the first side surface and entirely or substantially entirely on the second side surface.

3. The multilayer ceramic capacitor according to claim 1, wherein the SiO$_2$ films are provided entirely or substantially entirely on the first main surface and entirely or substantially entirely on the second main surface.

4. The multilayer ceramic capacitor according to claim 1, wherein, when at least one of the first external electrode or the second external electrode are removed and at least one of the first end surface or the second end surface are viewed, the SiO$_2$ film is annularly provided on the at least one of the first end surface or the second end surface.

5. The multilayer ceramic capacitor according to claim 1, wherein a maximum thickness of the SiO$_2$ film provided on the first side surface and the SiO$_2$ film provided on the second side surface is greater than or equal to about 1 μm and less than or equal to about 5 μm.

6. The multilayer ceramic capacitor according to claim 1, wherein a TiO$_2$ film is provided on at least a portion of outer surfaces of the SiO$_2$ films.

7. The multilayer ceramic capacitor according to claim 1, wherein at least a single-layer plating layer is provided on an outer surface of the first external electrode and an outer surface of the second external electrode.

8. The multilayer ceramic capacitor according to claim 1, wherein the first internal electrodes include end portions that are continuously exposed on the first side surface and the first end surface, and on the second side surface and the first end surface;

the second internal electrodes include end portions that are continuously exposed on the first side surface and the second end surface, and on the second side surface and the second end surface; and the SiO$_2$ films directly cover at least one of the end portions of the first and second internal electrodes.

9. The multilayer ceramic capacitor according to claim 1, wherein a thickness of the SiO$_2$ films on the first and second end surfaces increases along the height direction toward the first and second main surfaces.

\* \* \* \* \*